April 30, 1940. O. H. BANKER 2,199,095
AUTOMATIC TRANSMISSION
Filed Oct. 13, 1934 2 Sheets-Sheet 1
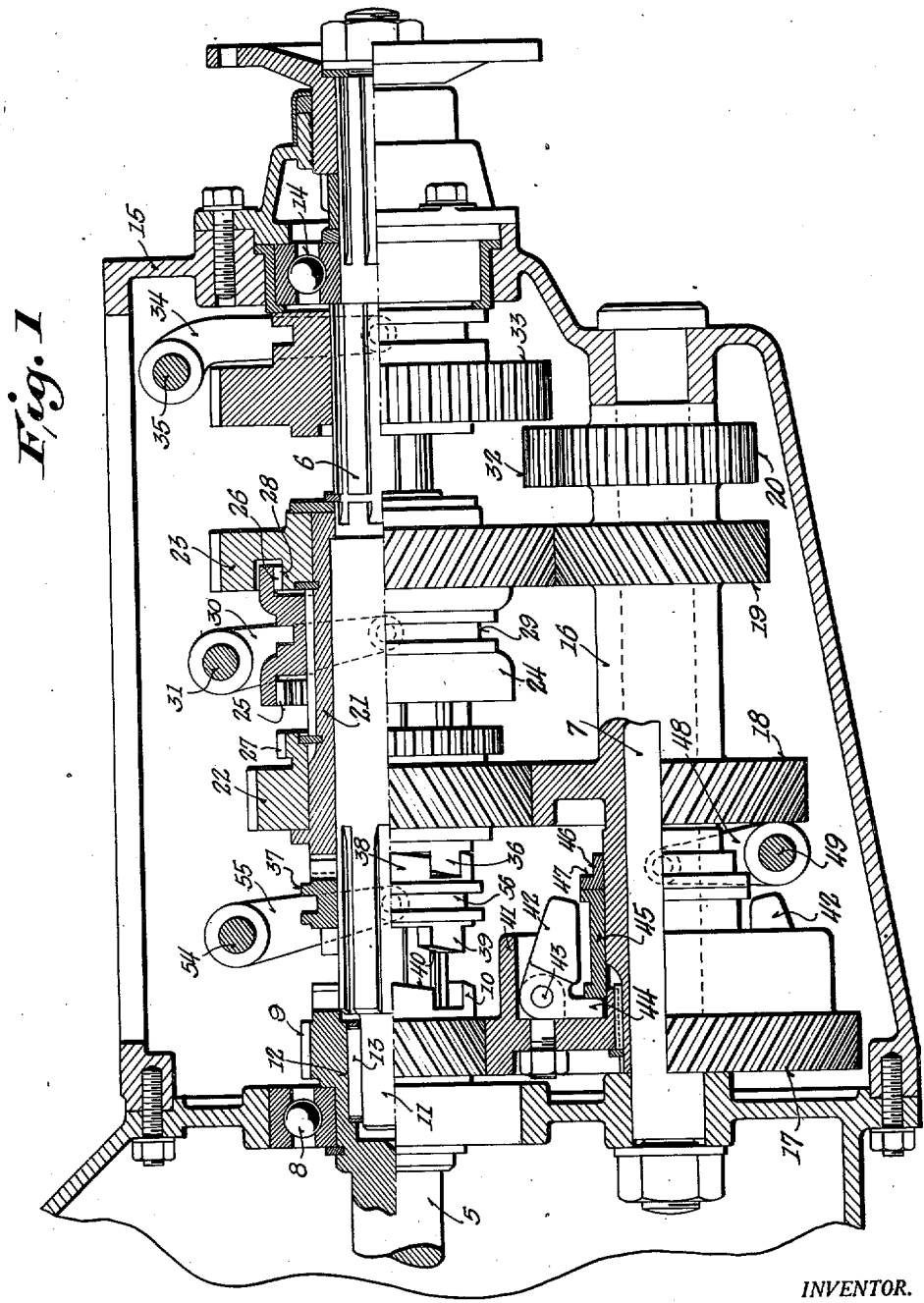
INVENTOR.
Oscar H. Banker
BY
Charles D French
ATTORNEYS April 30, 1940. O. H. BANKER 2,199,095
AUTOMATIC TRANSMISSION
Filed Oct. 13, 1934 2 Sheets-Sheet 2
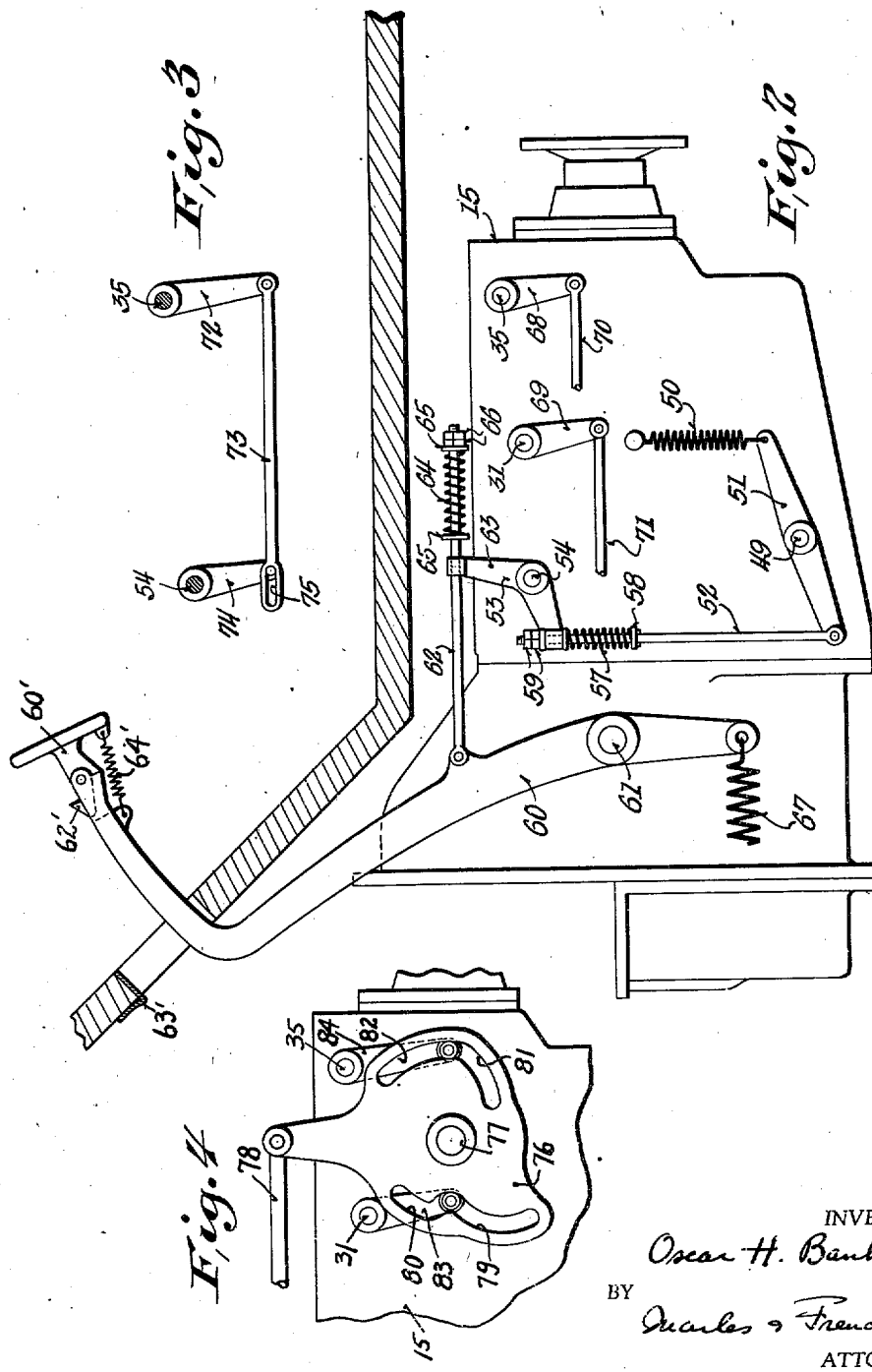
INVENTOR.
Oscar H. Banker
BY
Quarles & French
ATTORNEYS Patented Apr. 30, 1940

2,199,095

UNITED STATES PATENT OFFICE 2,199,095

AUTOMATIC TRANSMISSION

Oscar H. Banker, Chicago, Ill., assignor to New Products Corporation, Chicago, Ill., a corporation of Delaware Application October 13, 1934, Serial No. 748,185

13 Claims. (Cl. 74—336.5)

The invention relates to automatic transmissions.

The object of the invention is to provide a multi-speed transmission of very simple construction which will shift itself from a low to a direct or high gear ratio on a deceleration of the drive shaft to a speed synchronizing with the driven shaft and which may also be readily returned to or held in a low gear ratio.

A further object of the invention is to provide a multi-speed transmission with automatically variable speed changes and also optionally selective gear ratios for automatic speed changes from low to high or from second to high.

A further object of the invention is to provide an automatically variable change speed transmission with optionally selective gear ratios wherein any of the gear ratios from high to second or to low can be selected while the vehicle is in motion or while in high gear.

A further object of the invention is to provide a control which insures the transmission being in a low gear ratio whenever the operator is maneuvering his car from stand-still to reverse or forward.

A further object of the invention is to provide a change speed gear mechanism in which one of the elements of the speed responsive clutch member is on a driven member carrying reduction gears that may be selectively clutched thereto.

The invention further consists in the several features hereinafter set forth and more particularly defined by claims at the conclusion hereof.

In the drawings:

Fig. 1 is a vertical sectional view through a transmission embodying the invention;

Fig. 2 is a detail side elevation view of the transmission, parts being broken away;

Fig. 3 is a detail side elevation view of certain of the control mechanism;

Fig. 4 is a detail view of a portion of a control mechanism.

Referring to the drawings, the numeral 5 designates the drive shaft, 6 the driven shaft, 7 an intermediate shaft having geared connection with the shafts 5 and 6.

The shaft 5 is journalled adjacent one end in the ball bearing journal 8 and has the spiral gear 9 formed thereon or secured thereto and also a clutch jaw or face 10.

The driven shaft 6 is coaxially arranged relative to the shaft 5 and has one end 11 projecting in an axial bore 12 in the shaft 5 and journalled in roller bearings 13 in said bore and its other end portion is journalled in the ball bearing journal 14 mounted in the rear wall of the casing 15.

The intermediate or stud shaft 7 is mounted in the end walls of the casing and in parallel relation to the shafts 5 and 6, and it has a long sleeve or hollow shaft 16 journalled thereon.

The sleeve shaft 16 has a gear 17 keyed thereto meshing with the gear 9 and also gears 18, 19, and 20 formed integral therewith or secured thereto.

A sleeve shaft 21 is mounted on the driven shaft 6 and has the gears 22 and 23 loosely mounted thereon but adapted to be selectively clutched thereto by the shiftable clutch member 24 slidably keyed to said shaft and having toothed jaws 25 and 26 adapted to respectively mesh with the toothed jaw 27 on the gear 22 and the toothed jaw 28 formed in the gear 23, said member 24 having an annular groove 29 engaged by a shifter fork 30 on a manually controlled shaft 31.

The gears 22 and 23 respectively mesh with the gears 18 and 19 whereby two low gear ratios are obtained between the drive and driven shafts, the gears 23 and 19 providing the lowest gear ratio.

The gear 20 meshes with a back gear 32 which in turn is adapted to mesh with a shiftable reverse gear 33 slidably splined on the driven shaft 6 and controlled by a shifter fork 34 mounted on a control shaft 35.

The sleeve shaft 21 has a clutch jaw 36 formed on one end and a shiftable clutch member 37 has a clutch jaw 38 adapted in one position to mesh with the jaw 36 and a jaw 39 adapted to mesh in another position with the jaw 10 and also movable to a neutral position. The clutch jaws above mentioned have inclined faces 40 whereby the member 37 may overrun the mating jaw member with which it is to be engaged until the speeds of both members become synchronized.

The member 37 is shifted automatically under the action of speed responsive mechanism operatively connected therewith. As herein shown the gear 17 has a drum extension 41 in which the governor weights 42 are mounted upon the pivotal supports 43, said weights forming one of the arms of a lever whose other arm 44 is adapted to engage a sleeve 45 slidably mounted on a part of the sleeve 16 and engageable with a collar 46 also slidable upon said shaft and provided with a recess 47 engaged by the pins of a shifter fork 48 mounted on the control shaft 49. Movement of the weights to an expanded position is normally resisted by a tension spring 50 acting on one arm of a lever 51 secured to the shaft 49. The other arm of the lever 51 is connected by yieldable linkage with the clutch member 37 and for this purpose said lever is connected to one end of a link 52 which at its other end is slidably mounted in one arm of a lever 53 secured to a control shaft 54 having a shifter fork 55 mounted thereon and engaging the annular groove 56 of the member 37. The governor mechanism may also be mounted for direct drive by the driven shaft if desired. A spring 57 is mounted on said link 52 between a collar 58 thereon and the end of the lever 53 in which said link is mounted so that as the link 52 is moved upwardly the spring 57 transmits this force to the lever 53 and allows relative movement between these two parts so that the member 37 in moving from the position shown to a position in which the clutch jaw 39 is adapted to mesh with the jaw 10 may overrun said jaw 10 until said jaws are synchronized for engagement. Reverse movement of the shaft 54 is effected under the action of the spring 50 through the connection of the link 52 with the lever by the stop nuts 59 adjustably mounted on said link.

For holding the lever 53 in a position where the member 37 is engaged with the clutch jaw 36 and the transmission is in low gear, an operator controlled pedal 60 is pivoted at 61 on a suitable support and has a link 62 connected thereto at one end. The other end portion of said link 62 is slidably mounted in an arm 63 of the lever 53 and has a yieldable spring abutment mounted thereon comprising a spring 64 interposed between washers 65 and backed by the nuts 66. When the pedal 60 is pressed downwardly against its spring 67 the link 62 will be shifted forwardly and the spring 64 moved to a position to exert a yielding pressure on the arm 63 in the position shown and thus prevent its shifting to a position to establish high gear or direct drive.

For holding the pedal 60 in locked position the end 60' thereof is pivotally connected to the main portion of the pedal and has a latch-shaped portion 62' adapted to engage a plate 63' on the dash adjacent the opening in which the pedal works and urged against said plate by the action of the spring 64' when the pedal is moved to its depressed position. Since the portion 60' is pivoted relative to the main part of the pedal, the latch part 62' may be readily disengaged by swinging the part 60' about its pivot through the action of the operator's foot on the pedal.

The shafts 31 and 35 may be operated in any suitable manner and are here shown provided with crank arms 68 and 69 connected with operating links 70 and 71.

In order to prevent shifting the reverse gear, when the clutch is engaged, the shaft 35 may have a crank 72 secured thereto connected by a link 73 with a crank arm 74 on the shaft 54 through a lost motion slot connection 75.

With this construction the operator first selects the particular low gear that he wishes to use and as shown in Fig. 1 the lowest ratio gear 23 is clutched to the driven shaft 6 by the clutch member 24. The shaft 5 is coupled to the engine drive shaft either through a manually controlled clutch or an automatic or speed responsive clutch.

Under the above conditions the spring 50 normally acts through lever 51, link 52, lever 53, shaft 54, and shifter 55 to urge the clutch member 37 into engagement with the jaw 36 on sleeve 21 and thus provide the low gear ratio with the power flowing from shaft 5 through gears 9, 17, shaft 16, gears 19 and 23 to sleeve 21, clutch member 37 to the driven shaft 6. Under these conditions as the speed of the shaft 5 increases, the weighted levers 42 swing outwardly and reach their maximum travel at five miles an hour car speed and exert pressure upon the collars 45 and 46 and in opposition to the springs 50 and 57 and store up energy in the spring 57 but, owing to the torque, the clutch member 37 stays engaged with the jaw 36 against the force of spring 57 until the drive shaft 5 is decelerated, as by throttling the engine, and then the torque reaction is relieved and under the action of spring 57, the member 37 is shifted to bring the jaw 39 into position for engagement with the jaw 10 and engagement is effected when these parts are synchronized, as by decelerating the engine. The transmission will then remain in high gear or direct drive until the clutch member 37 is released from jaw 10 and for this purpose the shaft 5 is decelerated to interrupt the torque or gripping action between the jaws and then said member 37 is shifted manually toward the right and into a position for low gear through the depression of the pedal 60 and the action of the spring 64 upon the lever 53, the jaws 38 and 36 engaging when these parts are synchronized, as by accelerating the drive shaft, and under these conditions if the pedal 60 is kept down the low gear drive conditions will be maintained.

If while in high gear the speed of the vehicle is such that the weights 42 are overbalanced by the spring 50, then on a release of the torque through deceleration the member 37 will be shifted to bring the jaw 38 into position for engagement with the jaw 36 and engagement is effected when these parts are synchronized as by accelerating the engine.

While the vehicle is in motion the operator may change his selection of gear ratios so that the transmission will be automatically variable from either high to a low gear ratio or from high to second gear ratio, and for this purpose the clutch member 24 may be shifted under the control of the operator while the vehicle is in motion. If, for example, the driver is proceeding in low gear and wishes to proceed in second gear and accelerate his car in second gear, he first shifts the member 37, as previously described, so as to bring the clutch parts 10 and 39 to position for direct drive, and under these conditions the sleeve shaft 21 rotates freely, and then the operator through controls above described shifts the clutch member 24 so as to disengage the clutch parts 26 and 28 and engage the clutch parts 25 and 27, and as the inertia of the gears 22 and 23 are light, the change of gear ratios will be very quiet and unnoticeable. After engaging the clutch parts 25 and 27, if the operator had started from low gear, he can proceed to return the jaw member 37 so as to engage the clutch elements 36 and 38 in the manner previously described in the specification in establishing the low gear ratio from high. On the other hand if the operator had started in second gear with the clutch parts 25 and 27 engaged and he wishes to return to a low gear ratio, he can in the same way, by shifting the member 37 into engagement with the clutch member 10 and thereafter disengaging the clutch parts 25 and 27 and then engaging the clutch parts 26 and 28 and thereafter returning the clutch member 37 to engagement with the clutch member 36, effect this change while the car is in motion with ease and quiet. He may also while the transmission is in the high or direct drive ratio operate the control shaft 31 so as to shift the clutch member 24 to the desired lower gear ratio.

Fig. 4 of the drawings shows a modified control arrangement to prevent the operator using second gear ratio under certain conditions. Whenever the operator is maneuvering his car from standstill to reverse or forward this control arrangement insures his being in a low gear and it comprises a single cam control for the shafts 35 and 31. As herein shown the control cam 76 is pivotally mounted on the case 15 as at 77 and has an operating member or actuator 78 connected to it and adapted to be operated by the driver of the vehicle. This cam has a composite cam slot 79 of which 80 is an idle portion and a cam slot 81 of which 82 is an idle portion. Rollers on levers 83 and 84 operate respectively in the slots 79 and 81; said levers being respectively connected to the shafts 31 and 35. With this construction when the cam 76 is turned in an anti-clockwise direction, the roller for the lever 84 moves along the active part of the slot 81 and moves said lever so as to swing the shaft 35 in a clockwise direction and thus act to shift the reverse gear 33 into engagement with the idler gear 32 and at the same time the roller for the lever 83 runs in the idle portion 80 of the slot 79 so that said lever and consequently the shaft 31 do not move and the fork 30 remains in the low gear position as shown in Fig. 1. If then the operator wishes to go forward, he swings the control cam 76 clockwise and thus brings the reverse gear 33 out of engagement with the gear 32 while the lever 83 is in a position to maintain the low gear ratio. Further rotation from the point shown in Fig. 4 toward the right will bring the lever 83 under the action of the active part of the slot 79 and cause the shaft 31 to swing toward the left to move the clutch member 24 so as to establish second gear ratio and during this period the roller for the lever 84 is moving along the idle portion 82 of the slot 81 so that the reverse gear cannot be moved when the transmission is in second gear. It will be understood that this form of control may be used in place of the separate controls 71 and 70 shown in Fig. 2.

From the foregoing it will be noted that the shiftable jaw clutch member 37 may overrun relative to the jaw clutch members 10 and 36. In the high gear position the spring 57 permits a relative movement between the member 37 and the rod 52. In manual movement to a low gear position the spring 64 permits relative movement between the member 37 and the rod 62.

I desire it to be understood that this invention is not to be limited to any particular form or arrangement of parts except in so far as such limitations are included in the claims.

What I claim as my invention is:

1. In a change speed transmission, the combination of drive and driven shafts, a gear on said drive shaft, a sleeve shaft on said driven shaft, change speed gears mounted on said sleeve shaft, means for selectively connecting said change speed gears to said sleeve shaft, a countershaft, gears on said countershaft in constant mesh with the gears on said drive and sleeve shafts, jaw clutch mechanism for connecting said driven shaft either to said drive shaft or to said sleeve shaft, said clutch mechanism being of the overrunning type and operable to effect automatic engagement when cooperative jaws are synchronized, and speed responsive means for bringing the clutch mechanism to a position for engagement of the clutch jaws connecting said drive shaft to said driven shaft.

2. In a change speed transmission, the combination of drive and driven shafts, a gear on the drive shaft, a sleeve shaft on said driven shaft, change speed gears mounted on said sleeve shaft, means for selectively connecting said change speed gears to said sleeve shaft, a countershaft, gears on said countershaft in constant mesh with the gears on said drive and sleeve shafts, jaw clutch mechanism for connecting said driven shaft either to said drive shaft or to said sleeve shaft, said clutch mechanism being of the overrunning type and operable to effect automatic engagement when cooperative jaws are synchronized, and governor mechanism mounted on the countershaft and operatively connected with said shiftable member to bring it to a position for direct drive connection between said drive and driven shafts.

3. In a change speed transmission, the combination of drive and driven members, a high speed clutch for operatively connecting said members together, speed responsive mechanism for bringing said clutch to an engaging position, manually operable means for releasing said clutch, change speed gearing permanently connected to and driven from said drive member and operable, when connected to the driven member, to effect a drive at any one of a plurality of lower gear ratios between said members, means for selecting one of said lower gear ratios when the transmission is being operated through the high speed clutch without disconnecting said clutch, and a low speed clutch for establishing the selected low gear ratio in completing the driving connection between said members.

4. In a change speed transmission, the combination of drive and driven members, a high speed clutch for operatively connecting said members together, change speed gearing for operatively connecting said members having a permanent drive connection with said drive member and operable, when connected to the driven member, to effect a plurality of lower gear ratios between said members, means for selecting one of said lower gear ratios when the transmission is being operated through said high speed clutch without disconnecting said clutch, a low speed clutch for establishing the selected low gear ratio and completing the driving connection between said members, and speed responsive means for controlling said clutches.

5. In a change speed transmission, the combination of a drive member, a driven member, change speed gearing for operatively connecting said members having a permanent drive connection with said drive member and operable, when connected to the driven member, to effect a plurality of different gear ratios between said members, means for selecting one of said different gear ratios, clutch mechanism for operatively connecting said drive member to said driven member or connecting said drive member through the preselected gear ratio of said gearing to said driven member, speed responsive means for automatically operating said clutch mechanism, said selecting means being operable to select one of said different gear ratios when said clutch mechanism is connected for direct drive without disconnecting said clutch mechanism, and manually operable means for moving said clutch mechanism to its preselected gearing connection regardless of said speed responsive means.

6. In a change speed transmission, the combination of a drive member, a driven member, a high speed clutch operatively connecting said members together to establish a high gear ratio, change speed gearing for operatively connecting said members having a permanent drive connection with said drive member and having a driven element connectible to said driven member, said change speed gearing being operable, when connected to the driven member, to effect a plurality of lower gear ratios between said members, means for selecting one of said lower gear ratios when the transmission is being operated through said high speed clutch without disconnecting said clutch, and automatically engageable clutch mechanism for establishing the selected low gear ratio between said members when the speeds of said driven member and gearing driven element are synchronized and when said high speed clutch is disengaged.

7. In a change speed transmission, the combination of drive and driven members, a high speed clutch for operatively connecting said members together, speed responsive mechanism for bringing said clutch to an engaging position, change speed gearing for operatively connecting said members having a permanent drive connection with said drive member and having a driven element connectible to said driven member, said change speed gearing being operable, when connected to the driven member, to effect a plurality of lower gear ratios between said members, means for selecting one of said lower gear ratios when the transmission is being operated through said high speed clutch without disconnecting said clutch, and automatically engageable clutch mechanism for establishing the selected low gear ratio between said members when the speeds of said driven member and gearing driven element are synchronized and said high speed clutch is disengaged.

8. In a change speed transmission, the combination of drive and driven members, a clutch for operatively connecting said members directly together, change speed gearing for operatively connecting said members having a permanent drive connection with said drive member and operable, when connected to the driven member, to effect a plurality of different gear ratios between said members, means for selecting the gearing of one of said different gear ratios for the driving therethrough from said drive member to said driven member when the drive member is directly connected to said driven member by said clutch, a clutch for establishing the selected gear ratio connection between said members, and speed responsive means for controlling said clutches.

9. In a change speed transmission, the combination of drive and driven members, reduction gearing for operatively connecting said members having a permanent drive connection with said drive member and operable, when connected to the driven member, to effect second and low speed gear ratios therebetween including clutch mechanism for selectively establishing the second or the low gear ratio, a shiftable reverse gear and manually operable control mechanism for said clutch mechanism and reverse gear to allow operation of said reverse gear only when said clutch mechanism is in the low gear ratio, a clutch for connecting said drive member directly to said driven member, a clutch for connecting said gearing to said driven member, speed responsive mechanism for controlling said two last named clutches and operable on an increase in speed to control the clutch directly connecting said drive member with said driven member and operable on a decrease in speed to allow the operation of the clutch connecting said drive member through the previously selected gear ratio.

10. In a change speed transmission, in combination, a drive member, a driven member, speed change means driven by said drive member and adjustable to establish any one of a plurality of different speed ratios between said members when connected to said driven member, jaw clutch mechanism for connecting said drive member to said driven member either through said speed change means or directly thereto including a shiftable clutch member engageable with either of its two cooperative jaw clutch members when synchronized therewith, speed responsive means for moving said shiftable clutch member from its speed change means connecting position to position for direct drive, and manually operable means yieldingly connectible with said shiftable clutch member to shift said clutch member from its direct drive position to its position connecting the drive shaft to the driven shaft through said speed change means and to hold it in said last mentioned position.

11. In a change speed transmission, in combination, a drive member, a driven member, manually adjustable speed change means having a permanent drive connection with said drive member and operable, when connected to the driven member, to effect the drive of said driven member at any one of a plurality of different speed ratios, clutch mechanism for connecting said drive and driven members either directly together for direct drive or through said speed change mechanism including a shiftable clutch member, speed responsive means for moving said shiftable clutch member from its speed change means connecting position to a position for direct drive, and manually operable means connected to shift said shiftable clutch member regardless of said speed responsive means.

12. In a change speed transmission, in combination, a drive member, a driven member, change speed mechanism adapted to be connected between said members manually shiftable to preselect any one of a plurality of different speed ratios therebetween, an overrunning jaw clutch for effecting a direct drive between said members, an overrunning jaw clutch for effecting a drive of the driven member through said speed change mechanism, the jaws of each of said clutches being a part of a shiftable member, speed responsive means for moving said shiftable member between its speed change mechanism position and its direct drive position including a yieldable connection with said shiftable member operative as the direct drive connection is made, manually operable means also having a yieldable connection with said shiftable member for moving the same out of direct drive connection upon a deceleration of said drive member and into its speed change position upon an acceleration of said drive member, and a lost motion connection between said speed responsive means and said manually operable means.

13. In a change speed transmission, the combination of drive and driven shafts, a gear on said drive shaft, an intermediate shaft, change speed gears mounted on said intermediate shaft, means for selectively connecting said change speed gears to said intermediate shaft, a countershaft, gears on said countershaft in constant mesh with the gears on said drive and intermediate shafts, jaw clutch mechanism of the overrunning type for connecting said driven shaft either to said drive shaft or to said intermediate shaft, and means including speed responsive means for operating said jaw clutch mechanism.

OSCAR H. BANKER.